July 7, 1942.  N. M. COUTY  2,288,684

DETACHABLE COUPLING

Filed Nov. 1, 1940

INVENTOR
Norman M. Couty.
BY
ATTORNEY

Patented July 7, 1942

2,288,684

UNITED STATES PATENT OFFICE 2,288,684

DETACHABLE COUPLING

Norman M. Couty, Detroit, Mich., assignor to The Flex-O-Tube Company, a corporation of Delaware Application November 1, 1940, Serial No. 363,930

1 Claim. (Cl. 285—86)

This invention relates to detachable couplings for flexible hose and the like.

As the use of flexible hose becomes prevalent in industry, pressures carried by flexible hose lines are increased. As the pressures carried by flexible hose lines increase, the problem of providing adequate coupling means on the end or ends of flexible hose lines becomes more difficult. Many satisfactory coupling means have been devised wherein the coupling is crimped or otherwise fixed on the end of a flexible hose at the factory or at a shop particularly equipped to perform the necessary crimping or swaging operations.

Heretofore, detachable couplings for flexible hose have not been employed except at low pressures, say from 100 to 5,000 lbs. per sq. inch inasmuch as it has been found that, when those pressures are exceeded, the usual detachable coupling means employed would leak or part from the hose. By "detachable coupling means" it is meant a coupling which may be secured to and removed from the end of a flexible tube or hose without employing tools other than standard wrenches or a vise and a wrench.

With the foregoing in view, it is the primary object of the invention to provide a detachable coupling which may be applied to and removed from a flexible hose or the like by employing simple readily available hand tools and which will withstand without leaking or parting extremely high pressures.

Another object of the invention is to provide an inexpensive-to-manufacture and readily applicable detachable coupling means for flexible hose and the like wherein the coupling means affords a minimum of restriction for the passage of fluids through the coupling and hose.

Other objects of the invention will become apparent by reference to the following detailed description taken in connection with the accompanying drawing, in which.

Figure 1:
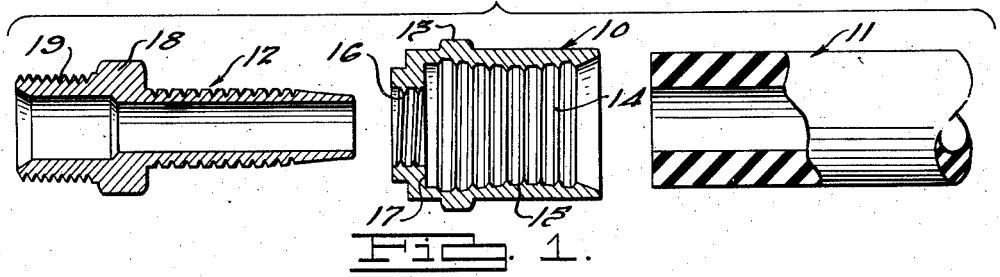
Fig. 1 is an exploded sectional view showing a detachable coupling embodying the invention.
Figures 2, 3:
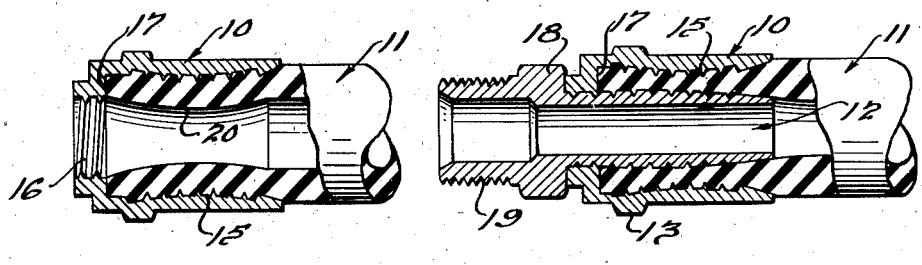
Fig. 2 is a partially assembled sectional view of the detachable coupling disclosed in Fig. 1.
Fig. 3 is a fully assembled sectional view of the detachable coupling disclosed in Figs. 1 and 2.

Referring now to the drawing wherein like numerals refer to like and corresponding parts throughout the several views, and with particular reference to Figs. 1, 2 and 3, the detachable coupling embodying the invention disclosed therein comprises, in general, a shell 10 into which a flexible somewhat compressible hose 11 is threaded from one end and into which a stem 12 is threaded from the other end, the said stem 12 being simultaneously threaded into telescopic relationship within the said hose 11 as shown in Fig. 3.

The said shell 10 is preferably formed hexagon at 13 to accommodate a wrench and has a threaded interior 14 which is formed at 15 to a restricted internal diameter. The said restricted internal diameter 15 of the internally threaded shell 10 is preferably located centrally along the said internally threaded portion 14 thereof as indicated in Fig. 1. The said shell 10 has a smaller internally threaded end portion 16 into and through which the stem 12 may be threaded. A shoulder 17 is formed at the base of the internally threaded portion 14 of the shell 10 against which the end of the flexible hose 11 abuts when threaded within the said shell 10.

The said stem 12 has a hexagon portion 18 formed integral therewith to accommodate a wrench or the like and has the outer end thereof formed and threaded as a male fitting member 19, or, the outer end of the said stem 12 may be formed and internally threaded as a female fitting member if desired.

When the flexible hose 11 is threaded into the larger end of the shell 10, the outer and inner periphery of the said hose 11 follow the contour of the internally threaded restricted portion 15 of the shell 10 causing the internal periphery of of the hose 11 to be restricted in a like manner as indicated at the numeral 20 in Fig. 2.

After the hose 11 and shell 10 have been assembled as indicated in Fig. 2, the stem 12 is threaded into the internally threaded end 14 of the said shell 10 and simultaneously into the end of the hose 11 which compresses the said hose 11 at the restricted portion 20 thereof creating a positive, leakproof and part-proof detachable coupling as shown in Fig. 3 that will withstand pressures from 11,0000 to 15,000 lbs. per sq. inch without leaking or parting. It will be noted that, by restricting the internal diameter of the large internally threaded end 14 of the shell 10 at 15, the end of the flexible hose 11 must be forced or pulled by internal pressure through a restricted annular space between the shell 10 and the stem 12 before the hose 11 will part from the detachable coupling under pressure.

It will be noted by reference to Fig. 2 that the extreme end of the flexible hose 11 does not protrude radially inward over the aperture of the internally threaded end portion 16 and block the entry of the end of the stem 12 into the said flexible hose 11. This is accomplished by the gradual restriction of the said shell 10 to a maximum restriction substantially at the longitudinal center of the internally threaded portion 14 thereof and tapering the said restriction off to provide a maximum internal diameter of the shell 10 at the shoulder 17 thereof. The fact that the end of the hose 11 does not block the entry of the stem 12 thereinto admits of using a larger aperture through the stem 12 because the inner end thereof need not be as blunt as would otherwise be required.

It will be observed that the fitting disclosed in Figs. 1 to 3 inclusive provides a wedge type grip which holds the flexible hose 11 between the shell 10 and stem 12 which is accountable for the extremely high pressures which the novel fitting will withstand without leaking or parting. This is accomplished in a detachable type coupling by the employment of a shell 10 having an internally threaded portion 14 into which the hose 11 is threaded which is restricted in internal diameter so as to restrict the internal diameter of the hose threaded therein and by the threading or otherwise urging into the said hose, after it has been threaded into the shell 10, a stem which compresses the said hose 11 and wedges it in the said shell 10 in such a manner that the end of the said hose 11 must be pulled through a restricted annular space in order to be parted from the fitting.

Although but one embodiment of the invention has been disclosed and described in detail, it is obvious that many changes may be made in the size, shape, arrangement and detail of the invention without departing from the spirit and scope of the invention as defined in the appended claim.

I claim:

A detachable coupling for flexible hose comprising a shell member internally threaded at one end the greater portion of its length to accommodate a flexible hose and internally threaded at the other end to accommodate a stem member forming a shoulder therebetween, a stem member including a substantially cylindrical externally threaded stem portion equal to or slightly larger in diameter than the internal diameter of said hose, the outer end of the said stem member being formed to serve as a coupling, the internally threaded portion of said shell member which accommodates said hose having its threads of uniform depth and being formed tapered to a restricted internal diameter substantially at the longitudinal center between its outer end and said shoulder to provide a restricted annular area between said shell member and the said externally threaded stem of the said stem member whereby when said stem member is inserted in said hose, said threads are pressed to a uniform depth into the material of the hose throughout the length of the shell.

NORMAN M. COUTY.